(12) United States Patent
Gimarc

(10) Patent No.: US 7,473,839 B2
(45) Date of Patent: *Jan. 6, 2009

(54) METHOD AND SYSTEM FOR TIME-SHORTENING SONGS

(75) Inventor: George Gimarc, Rowlett, TX (US)

(73) Assignee: Reel George Productions, Inc., Rowlett, TX (US)

( * ) Notice: Subject to any disclaimer, the term of this patent is extended or adjusted under 35 U.S.C. 154(b) by 93 days.

This patent is subject to a terminal disclaimer.

(21) Appl. No.: 11/389,486

(22) Filed: Mar. 24, 2006

(65) Prior Publication Data

US 2006/0272480 A1 Dec. 7, 2006

Related U.S. Application Data

(63) Continuation of application No. 10/271,674, filed on Oct. 15, 2002, now Pat. No. 7,038,118.

(60) Provisional application No. 60/356,868, filed on Feb. 14, 2002.

(51) Int. Cl.
G10H 1/00 (2006.01)
(52) U.S. Cl. ............................... 84/601; 84/609; 700/94
(58) Field of Classification Search ................. 84/600, 84/601, 609, 646, 649; 700/94; 434/308, 434/319; 708/172; 704/500, 503
See application file for complete search history.

(56) References Cited

U.S. PATENT DOCUMENTS

| | | | | |
|---|---|---|---|---|
| 5,410,097 | A * | 4/1995 | Kato et al. ..................... | 84/610 |
| 5,528,501 | A * | 6/1996 | Hanson ....................... | 701/200 |
| 5,990,406 | A * | 11/1999 | Nakamura et al. ............. | 84/609 |
| 7,324,953 | B1 * | 1/2008 | Murphy ....................... | 705/10 |
| 2002/0029685 | A1 * | 3/2002 | Aoki ........................... | 84/613 |
| 2002/0043149 | A1 * | 4/2002 | Barlay ...................... | 84/470 R |
| 2003/0046401 | A1 * | 3/2003 | Abbott et al. ............... | 709/228 |
| 2003/0192045 | A1 * | 10/2003 | Fellenstein et al. ............ | 725/29 |
| 2004/0027369 | A1 * | 2/2004 | Kellock et al. .............. | 345/716 |
| 2005/0277099 | A1 * | 12/2005 | Van Schaack et al. ....... | 434/322 |

OTHER PUBLICATIONS

Basic Audio Editing, [online], [retrieved Feb. 8, 2005], Retrieved from the Digital Editing Services Web site at , <URL: http://www.desmastering.com/basic.htm>See bottom of p. 2.*

* cited by examiner

Primary Examiner—David S. Warren

(57) ABSTRACT

A method and system for time-shortening one or more songs to generate time-shortened versions of the one or more songs are disclosed herein. In one embodiment, a song editor time-shortens one or more songs and provides the time-shortened versions to a music provider. The music provider can then distribute one or more of the time-shortened songs to one or more listeners. Alternatively, in another embodiment, a song editor enables a music provider to time-shorten one or more songs. The song editor can enable the music provider by providing the music provider a procedure to time-shorten a song, where the song is provided by the song editor or is obtained separately by the music provider. The music provider can then apply the supplied procedure to the song to generate a time-shortened vision. Alternatively, the song editor can enable the music provider by providing one or more characteristics of a song selected for time-shortening. These characteristics can be provided to the music provider as identifiers embedded in the data representative of the song or as identifiers provided separately, such as in a table. The music provider can then use the supplied characteristics to time-shorten the song according to a procedure available to the music provider. Various embodiments of the present invention can be performed manually or by using an automated process, such as a software application executed by a computer.

21 Claims, 11 Drawing Sheets

FIG. 6

| | TABLE 600 | |
|---|---|---|
| | SONG FORMAT COLUMN 690 | CORRESPONDING REDUCED STATEMENTS COLUMN 695 (FIG. 8) |
| | *12-BAR BLUES* | |
| 601 | I / $V_{\{c-v\}}$ / $XV_{solo}$ / $V_{\{c-v\}}$ / $V_{solo}$ / $V_{\{c-v\}}$ / $V_{solo}$ / O | 801, 802, 803, 804 |
| 602 | I / $XV_{\{c-v\}}$ / $YV_{solo}$ / $V_{\{c-v\}}$ / V / $V_{solo}$ / O | 801, 802, 803, 804, 805 |
| 603 | I / $XV_{\{c-v\}}$ / $V_{solo}$ / $XV_{\{c-v\}}$ / $V_{solo}$ / O | 803, 804 |
| 604 | I / $XV_{\{c-v\}}$ / $V_{solo}$ / $V_{\{c-v\}}$ / $V_{solo}$ / O | 803, 804 |
| 605 | I / $XV_{\{c-v\}}$ / V / $Y_1 V_{solo}$ / V / $Y_2 V_{solo}$ / V / O | 801, 802, 803, 804, 805 |
| 606 | I / $V_{\{c-v\}}$ / V / $X_1 V_{solo}$ / $V_{\{c-v\}}$ / V / $X_2 V_{solo}$ / O | 801, 802, 803, 804, 805 |
| 607 | I / $V_{\{c-v\}}$ / V / $X_1 V_{solo}$ / $YV_{\{c-v\}}$ / $X_2 V_{solo}$ / O | 801, 802, 803, 804 |
| 608 | I / $XV_{\{c-v\}}$ / $V_{solo}$ / $V_{\{c-v\}}$ / $V_{\{c-v\}}$ / $V_{solo}$ / O | 803, 804 |
| 609 | I / $XV_{\{c-v\}}$ / $V_{solo}$ / $V_{\{c-v\}}$ / $V_{solo}$ / V / O | 803, 804, 805 |
| 610 | I / $XV_{\{c-v\}}$ / V / O | 803, 804 |
| 611 | I / [ V / C ]$^Y$ / O | 806, 807, 808 |
| 612 | I / XV / O | 806, 807 |
| 613 | I / XV / $V_{solo}$ / V / C / V / O | 806, 807, 809, 810 |
| 614 | I / XV / $V_{solo}$ / V / V / $V_{\{v-c\}}$ / O | 806, 807, 809, 810 |
| 615 | I / $V_{\{c-v\}}$ / $V_{solo}$ / $V_{\{c-v\}}$ / $V_{solo}$ / $V_{\{c-v\}}$ / $V_{solo}$ / O | 811, 812, 813, 814 |
| 616 | I / $V_{\{c-v\}}$ / $V_{\{c-v\}}$ / $V_{solo}$ / $V_{\{c-v\}}$ / $V_{solo}$ / $V_{\{c-v\}}$ / O | 811, 812, 813, 814 |
| 617 | I / $XV_{\{c-v\}}$ / O | 811, 812, 813, 814 |
| 618 | I / $XV_{\{c-v\}}$ / V / O | 815, 816 |
| 619 | I / $XV_{\{c-v\}}$ / V / $V_{\{c-v\}}$ / O | 815, 816 |
| 620 | I / $V_{\{c-v\}}$ / $V_{solo}$ / $V_{\{c-v\}}$ / $V_{solo}$ / O | 811, 812, 813, 814 |
| 621 | I / [ $XV_{\{v-c\}}$ / $XV_{\{c-v\}}$ ]$^Y$ / V / O | 817 |
| 622 | I / $V_{\{v-c\}}$ / $XV_{solo}$ / $V_{\{c-v\}}$ / $V_{solo}$ / $V_{\{v-c\}}$ / $V_{solo}$ / O | 818 |
| 623 | I / $V_{\{v-c\}}$ / V / $X_1 V_{solo}$ / $V_{\{c-v\}}$ / V / $X_2 V_{solo}$ / O | 819 |
| 624 | I / $V_{\{v-c\}}$ / V / $X_1 V_{solo}$ / $YV_{\{c-v\}}$ / $X_2 V_{solo}$ / O | 820, 821 |
| 625 | I / $XV_{\{v-c\}}$ / $YV_{solo}$ / $V_{\{c-v\}}$ / V / $V_{solo}$ / O | 822 |
| 626 | I / $XV_{\{v-c\}}$ / $V_{solo}$ / $V_{\{c-v\}}$ / $V_{solo}$ / O | 822 |
| 627 | I / $XV_{\{v-c\}}$ / $V_{solo}$ / $V_{\{c-v\}}$ / $V_{\{v-c\}}$ / $V_{solo}$ / O | 822 |
| 628 | I / $XV_{\{v-c\}}$ / $V_{solo}$ / $YV_{\{c-v\}}$ / $V_{solo}$ / O | 822 |
| 629 | I / $XV_{\{v-c\}}$ / V / $Y_1 V_{solo}$ / V / $Y_2 V_{solo}$ / V / O | 823 |
| | CONTINUED IN FIG. 7 | |

FIG. 7

| | TABLE 600 (CONTINUED) | |
|---|---|---|
| | SONG FORMAT COLUMN 690 | REDUCED FORMAT COL. 695 (FIG. 8) |
| | *SONATA-ALLEGRO (SIMPLIFIED)* | |
| 630 | I / [ V / C ]$^Y$ / Br / XC / O | 824, 825 |
| 631 | I / V / C / [ V / C / Br ]$^Y$ / V / C / O | 824, 825 |
| 632 | I / [ V / C ]$^Y$ / Br / XC / O | 824, 825 |
| | *SONATA-ALLEGRO (SIMPLIFIED)* | |
| 633 | I / [ V / C ]$^Y$ / C / C / O | 826, 827, 828, 829 |
| 634 | I / [ V / C ]$^Y$ / V / O | 826, 827, 828, 829 |
| 635 | I / [ V / C ]$^Y$ / C / V / O | 826, 827, 828, 829 |
| 636 | I / [ V / C ]$^Y$ / O | 826, 827, 828, 829 |
| 637 | I / XV / C / V$_{solo}$ / XV / C / O | 826, 827, 828, 829 |
| 638 | I / [ V / C ]$^{Y1}$ / V$_{solo}$ / [ V / C ]$^{Y2}$ / O | 826, 827, 828, 829 |
| | *NO BRIDGE* | |
| 639 | I / [ V / C ]$^Y$ / V / O | 830, 831 |
| 640 | I / [ V / C ]$^Y$ / V / C / O | 830, 831 |
| | *NO BRIDGE (VARIABLE MEASURES)* | |
| 641 | I / X$_1$V / YC / X$_2$V / O | 832, 833 |
| 642 | I / X$_1$V / Y$_1$C / X$_2$V / Y$_2$C / O | 832, 833 |
| 643 | I / X$_1$V / Y$_1$C / X$_2$V / Y$_2$C / X$_3$V / O | 832, 833 |
| 644 | I / X$_1$V / Y$_1$C / X$_2$V / Y$_2$C / X$_3$V / Y$_3$C / O | 832, 833 |
| 645 | I / X$_1$V / Y$_1$C / X$_2$V / Y$_2$C / X$_3$V / Y$_3$C / X$_4$V / O | 832, 833 |
| 646 | I / X$_1$V / Y$_1$C / X$_2$V / Y$_2$C / X$_3$V / Y$_3$C / X$_4$V / Y$_4$C / O | 832, 833 |
| | *VERSES ONLY* | |
| 647 | I / XV / O | 834 |
| | *VERSES ONLY WITH SOLOS* | |
| 648 | I / XV / V$_{solo}$ / V / YV$_{solo}$ / V / O | 835 |
| | *VERSES ONLY WITH INTRO FIGURE* | |
| 649 | I / [ V / I ]$^Y$ / V / O | 836, 837 |
| 650 | I / [ V / I ]$^Y$ / XV / O | 838, 839 |
| 651 | I / [ V / I ]$^Y$ / XV / I / V / O | 838, 839 |
| 652 | I / V / I / V / V / I / XV / O | 838, 839 |
| | *NO CHORUS WITH BRIDGE* | |
| 653 | I / V / Br / V / O | 840, 841 |
| 654 | I / [ V / Br ]$^Y$ / V / O | 840, 841 |
| 655 | I / [ V / V / Br ]$^Y$ / V / V / O | 840, 841 |
| 656 | I / V / V / Br / V / O | 842 |
| 657 | I / V / V / Br / XV / O | 843, 844, 845 |
| 658 | I / X$_1$V / Br / X$_2$V / O | 843, 844, 845 |
| 659 | I / X$_1$V / Br / X$_2$V / Br / X$_3$V / O | 843, 844, 845 |
| | *BEGIN CHORUS NO BRIDGE* | |
| 660 | I / [ C / (X$_1$,X$_2$)V ]$^Y$ / C / X$_1$V / O | 846 |

FIG. 8

| | TABLE 800 |
|---|---|
| | REDUCED STATEMENTS 890 |
| 801 | $I / V_{\{c-v\}} / V_{\{c-v\}} / V_{solo} / V_{solo} / V_{\{v-c\}} / O\sim$ |
| 802 | $I / V_{\{c-v\}} / V_{\{c-v\}} / V_{solo} / V_{\{v-c\}} / O\sim$ |
| 803 | $I / V_{\{c-v\}} / V_{\{c-v\}} / V_{solo} / O\sim$ |
| 804 | $I / V_{\{c-v\}} / V_{solo} / V_{\{c-v\}} / O\sim$ |
| 805 | $I / V_{\{c-v\}} / V_{solo} / V / O\sim$ |
| 806 | $I / V / C / O\sim$ |
| 807 | $I / V / V / C_{\{c-v\}} / O\sim$ |
| 808 | $I / V / C / C / O\sim$ |
| 809 | $I / V / C / V_{solo} / O\sim$ |
| 810 | $I / V / V / C / V_{solo} / O\sim$ |
| 811 | $I / V_{\{c-v\}} / V_{solo} / V_{\{c-v\}} / O\sim$ |
| 812 | $I / V_{\{c-v\}} / V_{\{c-v\}} / O\sim$ |
| 813 | $I / V_{\{c-v\}} / V_{\{c-v\}} / V_{solo} / O\sim$ |
| 814 | $I / V_{\{c-v\}} / V_{\{c-v\}} / V_{solo} / V_{\{c-v\}} / O\sim$ |
| 815 | $I / V_{\{c-v\}} / V_{\{v-c\}} / V / O\sim$ |
| 816 | $I / V_{\{c-v\}} / V / V_{\{c-v\}} / O\sim$ |
| 817 | $I / [XV_{\{v-c\}}]^Y / V / O$ |
| 818 | $I / V_{\{v-c\}} / XV_{solo} / V_{\{v-c\}} / V_{solo} / O$ |
| 819 | $I / X_1 V_{\{v-c\}} / V / X_2 V_{solo} / O$ |
| 820 | $I / XV_{\{v-c\}} / V_{solo} / O$ |
| 821 | $I / XV_{\{v-c\}} / V / YV_{solo} / O$ |
| 822 | $I / XV_{\{v-c\}} / YV_{solo} / V_{\{c-v\}} / V / O$ |
| 823 | $I / XV_{\{v-c\}} / V / YV_{solo} / V / O$ |
| | CONTINUED IN FIG. 9 |

FIG. 9

| | TABLE 800 (CONTINUED) |
|---|---|
| | REDUCED STATEMENTS 890 |
| 824 | I / V / C / Br / O~ |
| 825 | I / V / C / O~ |
| 826 | I / V / C / O~ |
| 827 | I / V / C / V / O~ |
| 828 | I / V / C / V / O~ |
| 829 | I / V / C / V / C / O~ |
| 830 | I / V / C / O~ |
| 831 | I / V / C / O~ |
| 832 | I / XV / C / O~ |
| 833 | I / $X_1$V / C / $X_2$V / O~ |
| 834 | I / V / XV / O~ |
| 835 | I / XV / YV$_{solo}$ / XV / O~ |
| 836 | I / V / I / V / O~ |
| 837 | I / V / I / V / I / O~ |
| 838 | I / V / I / O~ |
| 839 | I / V / I / V / O~ |
| 840 | I / V / O~ |
| 841 | I / V / V / O~ |
| 842 | I / V / Br / V / O~ |
| 843 | I / V / V / Br / V / O~ |
| 844 | I / V / O~ |
| 845 | I / V / V / O~ |
| 846 | I / [ C / $(X_1,X_2)$V]$^Y$ / O |

| | KEY 950 |
|---|---|
| SYMBOL | MEANING (Z = V, C, Br, O, a sequence thereof, etc.) |
| V | Verse |
| C | Chorus |
| I | Intro (may or may not appear) |
| O | Outro |
| O~ | Outro repeated |
| Br | Bridge |
| $V_{solo}$ | Instrumental bridge built from a V or C |
| $V_{(c-v)}$ | V derived from a C that works as a V with changing lines |
| $V_{(v-c)}$ | V derived from a V that has a line that works as a C or song title |
| $C_{(c-v)}$ | C derived from a C that works as a V with changing lines |
| $C_{(v-c)}$ | C derived from a V that has a line that works as a C or song title |
| [ Z ]$^Y$ | Z repeated Y times. ex. [ V / C ]$^2$ = V / C / V / C |
| XZ, $X_1$Z, $X_2$Z, ... | Z extended over X measures ($X_1$Z having different # of measures than $X_2$Z) |
| YZ, $Y_1$Z, $Y_2$Z, ... | Z extended over Y measures ($Y_1$Z having different # of measures than $Y_2$Z) |

METHOD AND SYSTEM FOR TIME-SHORTENING SONGS

APPLICATION

This application is a continuation of U.S. patent application Ser. No. 10/271,674, filed on Oct. 15, 2002 (issued as U.S. Pat. No. 7,038,118 B1), which claims priority to provisional U.S. patent application No. 60/356,868 filed on Feb. 14, 2002, entitled "METHOD AND SYSTEM FOR TIME-SHORTENING SONGS".

FIELD OF THE DISCLOSURE

The present invention relates generally to editing songs and more particularly to the time-shortening of songs.

BACKGROUND

Musical content is delivered by music providers to listeners in a variety of ways. Songs are broadcast via radio, transmitted over the Internet as streaming data or audio files, played over telephone networks while on hold, played in elevators and other public places, played using music devices, such as jukeboxes and MP3 players, and the like. In general, the goal of music providers is to increase listenership by increasing the time-spent-listening (TSL) or the number of listeners. As the listenership increases, so can the benefit to the music provider. For example, a music provider with a higher level of listenership for a certain time period can generally charge more to broadcast advertiser's commercials during that time period than can a music provider with a lower level of listenership. Accordingly, music providers have developed various ways to develop listenership.

One way used by music providers to increase the number of listeners or the TSL for the average listener is to limit the type of songs provided. For example, radio broadcasters often broadcast only songs of a certain genre, such as country-western, rap, alternative, rock, and the like. However, this can result in a decrease in the number of listeners or the TSL since an increased focus may cause those listeners who enjoy a broader variety of songs to listen to other radio broadcasters who offer a broader variety. Likewise, the number of songs that fit a certain genre may be limited, resulting in a limited library from which to select songs for broadcast. As a result, the same songs are played over and over, generally causing listeners to change radio stations as they grow tired of listening to the same songs repeatedly.

Music providers, rather than focusing the type of songs provided, sometimes broaden the types of songs provided. For example, radio broadcasters often use radio formats that play songs from a number of decades or that broadcast songs from a variety of genres. While this may increase the number of potential listeners since a wide variety of tastes are represented, listeners, in general, have limited patience when listening to songs of a genre that is not appealing to the listener. For example, it has been estimated that the average listener will tolerate an unappealing song for around 60 to 90 seconds. Since most songs are over 90 seconds in length, this could indicate that the average listener is likely to "tune in" to another radio station before the unappealing song is finished. As a result, listeners may choose to listen to other radio stations having a more focused genre, resulting in a decrease in listenership for the music provider.

One generally effective method of increasing listenership is for a music provider to play an increased number of songs per hour compared to other music providers. The increased number of songs played appeals to listeners since they are able to listen to more songs. Additionally, since an increased number of songs per hour are played and it is generally undesirable to repeatedly play the same songs, the music provider must include a greater number and/or a wider variety of songs in its library. However, by playing more songs per hour, the music provider generally has less time to air advertisements, decreasing the advertising revenue of the music provider.

Accordingly, music providers have developed ways to edit songs. Disk jockeys, for example, will often omit the intro and/or the outro of a song to shorten it. However, this has a number of drawbacks. Often, songs will have an intro and/or outro of an insignificant length, limiting the amount by which the song can be shortened using conventional methods. Additionally, the intro and/or outro may be the most identifiable part of the song, (i.e. the hook), and may cause listener dissatisfaction if removed or shortened.

Given these limitations, as discussed, it is apparent that conventional methods of increasing listenership are less than perfect.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification.

FIGS. 6 & 7 are a table illustrating a plurality of song formats according at least one embodiment of the present invention;

FIGS. 8 & 9 are a table illustrating a plurality of reduced formats corresponding to the plurality of song formats of the table of FIGS. 6 & 7 according to at least one embodiment of the present invention;

DETAILED DESCRIPTION OF THE FIGURES

In accordance with at least one embodiment of the present invention, one or more characteristics of a plurality of song portions are identified for each song of a plurality of songs.

The one or more characteristics are provided to a music provider, wherein the music provider is enabled to provided modified songs, the modified songs having one or more of their respective song portions removed based on the one or more characteristics. One advantage in accordance with a specific embodiment of the present invention is that the listenership of a music provider can be increased since more songs can be played in a given time period. Another advantage is increased listener enjoyment since unappealing songs take less of the listener's time.

FIGS. 1-11 illustrate a method and system for time-shortening one or more songs to generate time-shortened versions of the one or more songs. In one embodiment, a song editor time-shortens one or more songs and provides the time-shortened versions to a music provider. The music provider can then distribute one or more of the time-shortened songs to one or more listeners. Alternatively, in another embodiment, a song editor enables a music provider to time-shorten one or more songs. The song editor can enable the music provider by providing the music provider a procedure to time-shorten a song, where the song is provided by the song editor or is obtained separately by the music provider. The music provider can then apply the supplied procedure to the song to generate a time-shortened version. Alternatively, the song editor can enable the music provider by providing one or more characteristics of a song selected for time-shortening. These characteristics can be provided to the music provider as identifiers embedded in the data representative of the song or as identifiers provided separately, such as in a table. The music provider can then use the supplied characteristics to time-shorten the song according to a procedure available to the music provider. Various embodiments of the present invention can be performed manually or by using an automated process, such as a software application executed by a computer.

Figure 1:
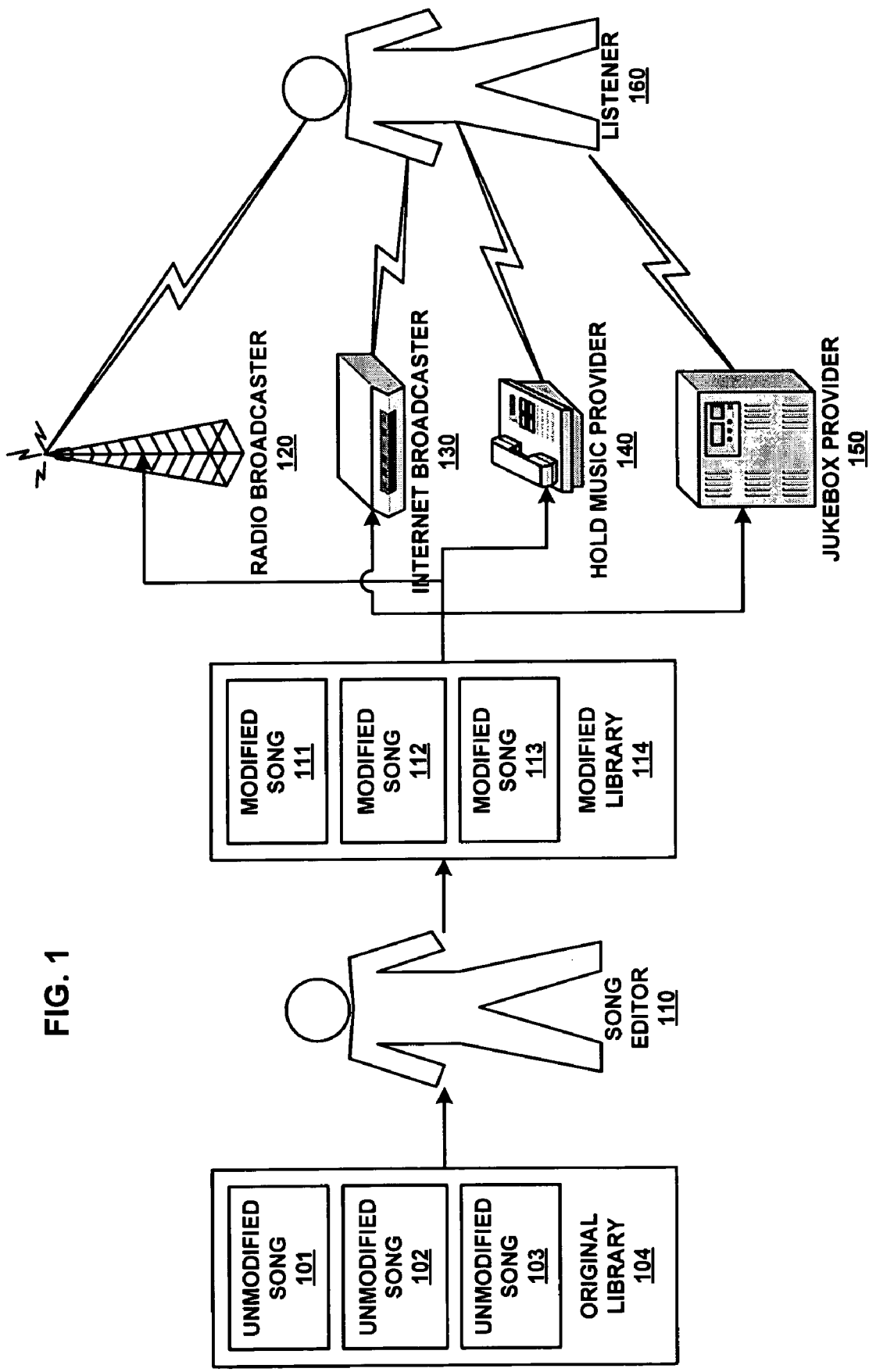
FIG. 1 is a diagram illustrating a method for generating and distributing time-shortened versions of a plurality of songs according to at least one embodiment of the present invention.

Referring now to FIG. 1, a method for generating and distributing songs having a time-shortened format is illustrated according to at least one embodiment of the present invention. In at least one embodiment, a plurality of unmodified songs 101-103 are selected for inclusion in original library 104 by song editor 110. Unmodified songs 101-103 can include various versions of songs, such as extended play song, a radio version, a club mix version, and the like. For example, unmodified song 101 could include an extended play version of a first alternative rock song, unmodified song 102 could include a radio version of a second alternative rock song, and unmodified song 103 could include a club mix version of a rhythm and blues (R&B) song. Unmodified songs 101-103 could be selected by song editor 110 for inclusion in original library 104 based on a variety of characteristics, such as song type, song length, tempo, performing artist, and the like. For example, song editor 110 could use one of a number of software applications used in the radio broadcast industry to generate playlists, such as WaveCast™ by Keogh Software. Song editor 110 can include any entity that functions to time-shorten one or more of unmodified songs 101-103, such as a music production studio, a music distributor, a disc jockey service, and the like. For example, song editor 110 could include a producer of a compilation of time-shortened versions of the top 40 songs of a certain year to be recorded on a compact disc (CD).

Song editor 110, in one embodiment, time-shortens one or more songs of original library 104 to generate modified library 114. As illustrated in FIG. 1, modified songs 111-113 represent time-shortened versions of unmodified songs 101-103, respectively. Although one embodiment of the present invention is illustrated in FIG. 1 wherein all the songs (unmodified songs 101-103) included in original library 104 are time-shortened to produce modified songs 111-113 of modified library 114, in other embodiments, modified library 114 can include a combination of one or more time-shortened songs (modified songs 111-113) and original length songs (unmodified songs 101-103). For example, more than 25% of the songs of modified library 114 could include time-shortened versions (modified songs 111-113) while less than 75% would be original length songs (unmodified songs 101-103), or the percentage of time-shortened songs to original length songs could be greater than 50%, and so on.

It will be appreciated that multiple versions of different lengths of the same song are sometimes produced. For example, record labels sometimes produce a radio version, an extended play version, and/or a mix version of the same song. Accordingly, in one embodiment, the phrase "time-shortening" of a song, as used herein, can refer to the time-shortening of a commercially available version of the song to generate a time-shortened song that is either shorter than any other commercially available version of the song, or time-shortened in such a way that the time-shortened version is different from any other commercially available version of the song. Likewise, the term "original length", as used herein, generally refers to the length of the song being time-shortened instead of the length of the original song before it has been time-shortened by a producer or otherwise to generate a commercially available version, such as a radio version. Furthermore, the term "unmodified songs" generally refers to the song being time-shortened as opposed to the original song before it has been time-shortened by a producer.

Song editor 110 can time-shorten unmodified songs 101-103 using a variety of methods. In one embodiment, song editor 110 identifies a plurality of song portions of an unmodified song. A procedure can then be applied to time-shorten the song. For example, song portions identified in unmodified song 101 could include an intro, a first verse, a first chorus, a second verse, a second chorus, and an outro. The second verse and chorus could be removed to generate modified song 111, where modified song 111 includes the intro, the first verse, the first chorus, and the outro. In this case, the procedure could include instructions on the identification of the second verse and chorus for removal. In at least one embodiment, the plurality of song portions are weighted according to the characteristics of the song portions. For example, if unmodified song 101 had three different verses and is to be shortened to a song having only two verses, the two verses most familiar to listeners could be selected for inclusion in the time-shortened song. Accordingly, song editor 110 could weight each of the three verses according to their familiarity and keep only the first and second most familiar verses. Alternatively, one or more segments of one or more song portions can be removed from an unmodified song. In one embodiment, one or more of unmodified songs 101-103 are time-shortened to generate one or more modified songs 111-113, where each is time-shortened to a predetermined length, or where each is time-shortened so that the sum of the lengths of the one or more modified songs 111-113 is of a total predetermined length. In this case, a small segment, such as a few seconds worth, could be removed from one or more portions of unmodified songs 101-103 to time-shorten them to the predetermined lengths.

In one embodiment, the process of time-shortening one or more unmodified songs 101-103 is performed manually. For example, an operator of song editing equipment could identify the plurality of song portions of unmodified song 101 by ear, remove the unwanted song portions, and recombine the remaining portions to generate modified song 111. Alternately, in another embodiment, the time-shortening process is performed in part or in whole by an information processing system. For example, a software application could be used to identify the plurality of portions of unmodified song 101, remove certain portions based on a formula that identifies portions to keep and/or portions to remove and generate modified song 111 from the remaining portions. Methods and systems to time-shorten unmodified songs are discussed in greater detail subsequently.

Song editor 110, in one embodiment, provides modified library 114 to a music provider for distribution to listener 160. Various embodiments of a music provider include radio broadcaster 120, Internet broadcaster 130, hold music provider. 140, and jukebox provider 150. Radio broadcaster 120 can include any type of wireless broadcaster, such as a frequency modulation (FM) radio station, an amplitude modulation (AM) radio station, a satellite broadcaster, a wireless phone music content provider, and the like. Internet broadcaster 130 can include a World Wide Web radio broadcaster, an Internet-based broadcast of a wireless broadcaster, a digital cable provider, and the like. Hold music provider 140 can include providers of hold music, such as the music played to a telephone user when placed on hold, or a provider of "muzak", such as instrumental versions of popular songs played in elevators or banquet halls. Jukebox provider 150 can include providers of portable music devices, such as jukeboxes and MP3 players. Although various embodiments of a music provider are illustrated with reference to FIG. 1, a music provider can include other types of providers of music content without departing from the spirit or scope of the present invention. For example, a music provider can include a music broadcaster that utilizes General Motor's OnStar™ system to broadcast songs to OnStar™ subscribers.

One or more songs of modified library 114, in one embodiment, are distributed to listener 160 by the music provider. Reference to the "distribution" of a song to listener 160, as used herein, can include any method of delivering the musical content of a song to listener 160. For example, distribution of a song can include a radio broadcast of the song, broadcasting the song over the Internet, playing the song over a telephone network to listener 160 while listener 160 is on hold, playing the song in an elevator in use by listener 160, playing the song using a jukebox, encoding the musical content of the song onto a CD and providing the CD to listener 160, and the like.

In at least one embodiment, the purpose of time-shortening unmodified songs 101-103 into modified songs 111-113 for distribution to listener 160 is to give listener 160 a perception of more songs played over a certain time period and/or a perception of more enjoyable songs. It is often possible to remove less-familiar portions of a song or to shorten a certain portion of the song without an average listener noticing the difference between the time-shortened version and the original length version. Accordingly, more time-shortened songs (modified songs 111-113) can be played in a certain time period than original length songs (unmodified songs 101-103) could. For example, if unmodified songs 101-103 were each four minutes long, it would take twelve minutes to play them back to back. Likewise, if the modified version (modified songs 111-113) of the same unmodified songs were time-shortened to three minutes each, it would take only nine minutes to play them back to back, leaving time for a fourth three-minute song to be played in the same time as the three three-minute songs (unmodified songs 101-103). However, because modified songs 111-113, in one embodiment, can be time-shortened in a way that is imperceptible by a casual listener (listener 160), listener 160 could perceive that a certain music provider plays more songs in a given time period than other music providers that only play the original length songs (unmodified songs 101-103). In addition to a perception of an increased number of songs played per time period, listeners 160 could generally perceive that the ratio of liked songs to disliked songs is higher. Since disliked songs, after time-shortening, take less time to be played, listener 160 could take less notice of disliked songs.

Although original length songs (unmodified songs 101-103) can be time-shortened, using methods and/or systems disclosed herein, in a way that is imperceptible to an average listener who is not intimately familiar with the original-length song, it will be appreciated that certain listeners, such as audiophiles or fans of the artist performing the song, may notice any modification to the original length song. Accordingly, in at least one embodiment, listener 160 includes a casual listener who would not readily notice a difference between an original length version of a song and a version time-shortened according an embodiment of the present invention. For example, some modern music radio stations (radio broadcaster 120) often have a "retro" hour wherein songs from previous decades are played during a certain period of the day, such as during the lunch hour. In this case, a casual listener (listener 160) could include a person listening to the "retro" hour, but is typically an avid listener of the regular genre of the radio station. Since this listener is familiar with the modern-music songs played, a modification to modern songs may be noticed. However, since this listener does not usually listen to songs from previous decades, this listener generally would not notice a difference between a time-shortened version and the original length version of a song from a previous decade.

Alternately, in another embodiment, listener 160 can include listeners who would normally notice a difference between time-shortened and original-length versions but are not adversely affected by such a modification. For example, listener 160 could include a person listening to the radio while driving during rush hour. Since the listener's attention is divided between driving and listening to the radio, the listener may not notice nor care that the song being played has been time-shortened. Likewise, listener 160 could include those listeners who have shortened attention spans and enjoy listening to time-shortened versions of a song, since they could otherwise lose interest during the broadcast of the original length version of the song.

Figure 2:
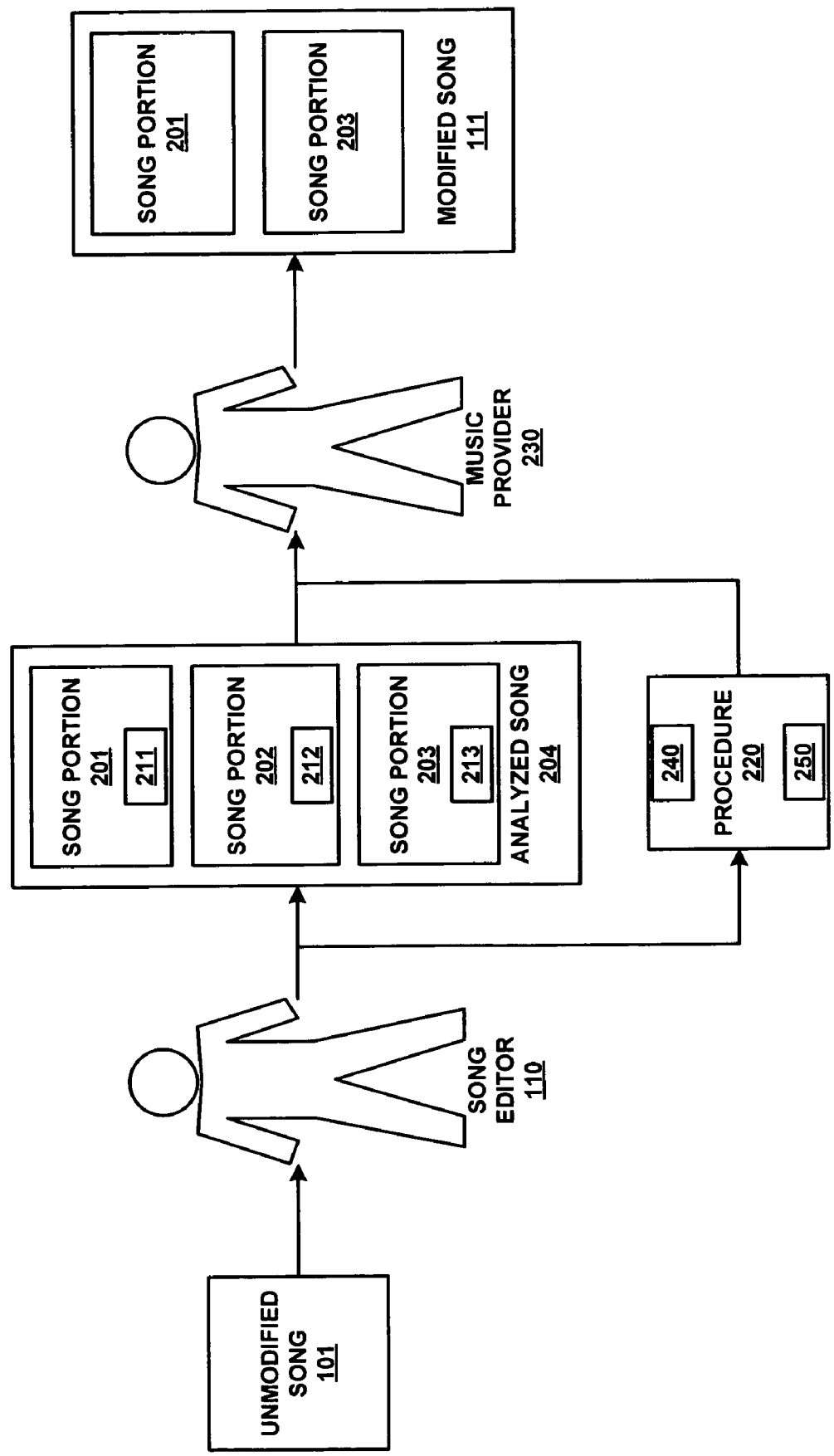
FIG. 2 is a flow diagram illustrating a method for enabling a music provider to generate time-shortened versions of a song according to at least one embodiment of the present invention.

Referring to FIG. 2, a method for providing the ability to time-shorten songs to a music provider is illustrated according to at least one embodiment of the present invention. As discussed previously, in one embodiment, song editor 110 (FIG. 1) time-shortens one or more unmodified songs 101-103 (FIG. 1) to generate modified library 114 (FIG. 1) and provides modified library 114 to music provider 230 for distribution to one or more listeners 160 (FIG. 1). Alternatively, in one embodiment, song editor 110 provides the ability to time-shorten songs to music provider 230 so that time-shortened songs (modified songs 111-113, FIG. 1) can be generated by music provider 230 rather than by song editor 110.

In at least one embodiment, song editor 110 analyzes unmodified song 101 to identify a plurality of song portions 201-203. Song portions 201-203 can include an intro, an outro, a chorus, a verse, a bridge, and the like. As discussed previously, song editor 110, in one embodiment, identifies song portions 201-203 manually. In this case, an operator of song editing equipment could listen to unmodified song 101 and subjectively determine the start points and end points of song portions 201-203, as well as determine certain characteristics of song portions 201-203, such as tempo, notes or chords played, and the like. Alternatively, a software or hardware application could analyze unmodified song 101 to determine song portions 201-203, as well as any desired characteristics of song portions 201-203. For example, the software applications could separate unmodified song 101 into song portions 201-203 based on changes in tempo or the frequency composition of different parts of the song. The analysis of unmodified song 101 can also be performed by a combination of manual analysis and software/hardware-based analysis. For example, a song-editing operator could: determine song portions 201-203 by ear and a software application could determine one or more characteristics of song portions 201-203, such as beats-per-minute.

In at least one embodiment, song portions 201-203 are assigned characteristic weights based on characteristics of song portions 201-203 relative to each other. For example, in one embodiment, the familiarity of each of song portions 201-203 to the average listener (listener 160, FIG. 1) is determined, and a familiarity weight is given to each of song portions 201-203 based on the determined familiarity. The familiarity weights could then be used to assist in the removal of one or more of song portions 201-203 to generate modified song 111. For example, it is generally preferable to remove a less familiar song portion than a more familiar song portion so that listener 160 is less likely to notice that a song portion has been removed. Other characteristics, such as song portion length, can be weighted against each other, and the appropriate character weights assigned.

After song portions 201-203 and/or their characteristics have been identified, in one embodiment, one or more identifiers (identifiers 211-213) are associated with each song portion 201-203. Identifiers 211-213 could include a start-of-portion indicator, an end-of-portion indicator, a portion length indicator, a characteristic weight, and the like. For example, song portion 201 could include two identifiers 211, the first identifier 211 including a start-of-portion indicator and the second identifier 211 including an end-of-portion identifier. Identifiers 211-213 can also include information about characteristics of each song portion, such as tempo, portion type (i.e. intro, outro, verse, chorus), and the like.

In one embodiment, identifiers 211-213 are embedded within the respective song portions 201-203. For example, in cases wherein unmodified song 101 (as song portions 201-203) is recorded on a magnetic tape, identifiers 211-213 can be embedded within the magnetic tape, such as embedding the information represented by identifiers 211-213 at an audio frequency that is usually undetectable by humans, such as above 20 kilohertz (kHz). Likewise, in cases where unmodified song 101 is recorded in a digital format on a compact disc (CD), digital versatile disc (DVD), or stored in file format a hard disc, such as in a MP3 format, identifiers 211-213 could be embedded within the data representative of song portions 201-203.

In one embodiment, song portions 201-203 and their associated identifiers 211-213, herein collectively referred to as analyzed song 204, are provided to music provider 230. Music provider 230, in at least one embodiment, can time-shorten analyzed song 204 to generate modified song 111, where the time-shortening process is based on the removal of one or more of song portions 201-203 and/or based on identifiers 211-213 associated with song portions 201-203. As discussed previously with reference to song editor 110, music provider 230, using identifiers 211-213, can identify and remove one or more song portions 201-203 to generate modified song 111. For example, as illustrated in FIG. 2, music provider 230, based on one or more characteristics of song portions 201-203, selected song portion 202 for removal to generate modified song 111 having song portion 201 and 203. Likewise, music provider 230 could remove one or more segments from one or more song portions 201-203 to generate modified song 111. For example, a segment from each song portion 201-203 could be removed to generate a time-shortened version (modified song 111) of analyzed song 204.

Instead of providing song portions 201-203 and identifiers 211-213 to music provider 230, in one embodiment, song editor 110 provides identifiers 211-213 without song portions 201-203. In this case, music provider 230 could then utilize a copy of unmodified song 101 available to music provider 230 to generate modified song 111 based on identifiers 211-213. For example, identifiers 211-213 could include a song portion length of an intro, verse, and chorus (embodiments of song portions 201-203), respectively, of unmodified song 101. In this example, song editor 110 could provide identifiers 211-213 to music provider 230. Music provider 230 could then determine song portions 201-203 of a copy of unmodified song 101 available to music provider 230 and time-shorten the copy after identifying song portions 201-203. For example, identifier 211 could include a first portion length of 20 seconds, identifier 212 could include a second portion length of 30 seconds, and identifier 213 could include a third portion length of 15 seconds. If music provider 230 desired to time-shorten its copy of unmodified song 101 by removing the second portion (song portion 202), music provider 230 could combine the first 20 seconds with the last 15 seconds of the copy of unmodified song 101 to generate modified song 111 having the first song portion (song portion 201) and the third song portion (song portion 203).

In at least one embodiment; song editor 110 provides procedure 220 to music provider in addition to song portions 201-203 and/or identifiers 211-213. Procedure 220, in one embodiment, includes a process to reduce the original length song having song format 240 to a version of the song having reduced format 250. Procedure 220 can include one or more algorithms for time-shortening unmodified song 101 to generate modified song 111. For example, song format 240 can include a sequence of symbols representative of song portions 201-203 and reduced format 250 can include a different sequence of symbols representative of some of song portions 201-203. Procedure 220, in this case, could include instructions to determine those song portions of song portions 201-203 common to both song format 240 and reduced format 250 and remove those of song portions 201-203 that are not in both song format 240 and reduced format 250. Procedures 220 is discussed in greater detail with reference to FIGS. 6-9.

Figure 3:
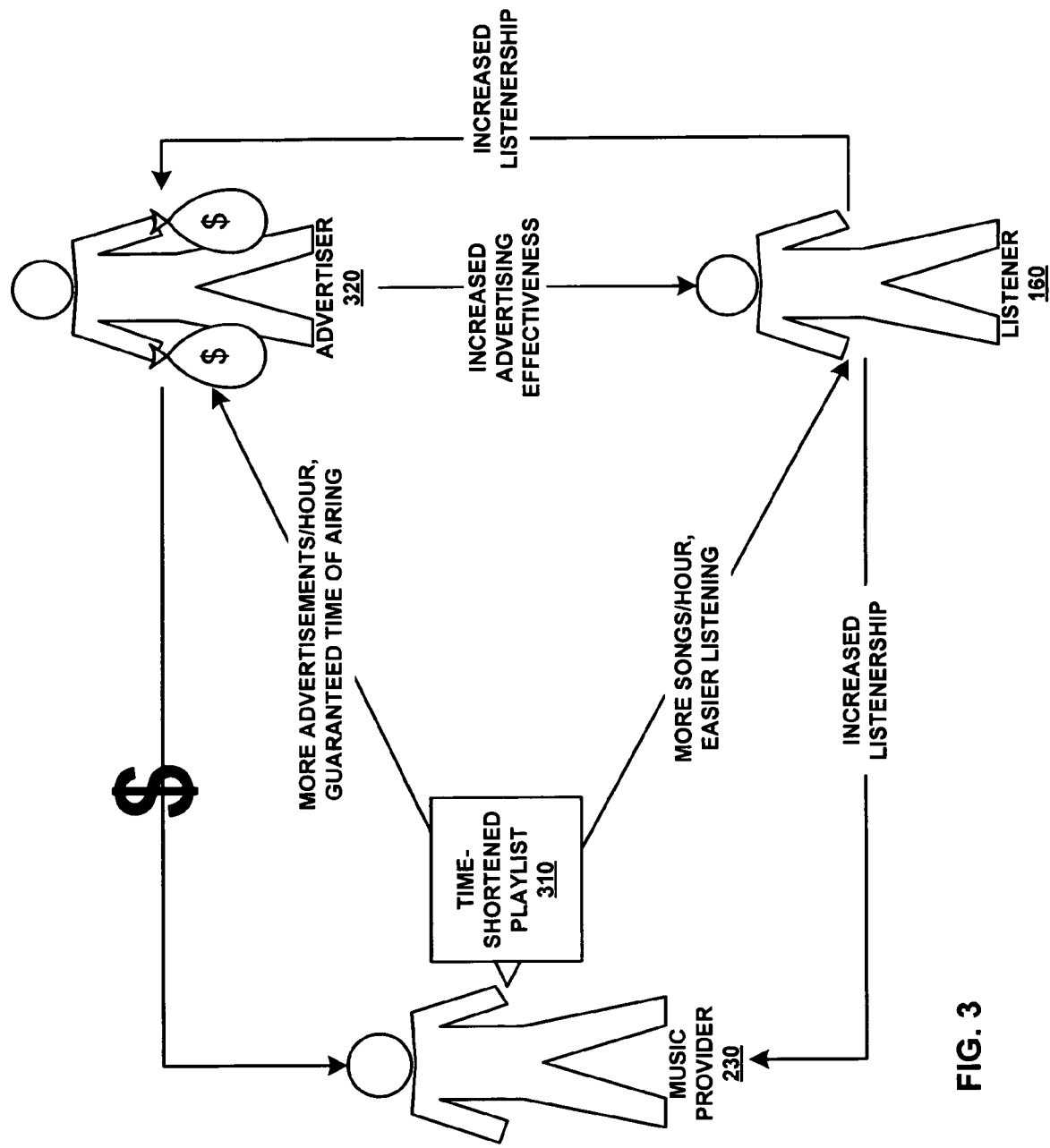
FIG. 3 is a block diagram illustrating the relationship between a music provider, an advertiser and a listener according to at least one embodiment of the present invention.

Referring next to FIG. 3, a relationship between a music provider promoting a time-shortened song playlist, an advertiser, and a listener are illustrated according to at least one embodiment of the present invention. As discussed previously, in at least one embodiment, music provider 230 broadcasts a plurality of songs from modified library 114 (FIG. 1) in a format where one or more of the plurality of songs include a time-shortened version (modified songs 111-113) of an original length song (unmodified songs 101-103). The plurality of songs containing at least one time-shortened song is herein referred to time-shortened playlist 310. In at least one embodiment, music provider 320 promotes time-shortened playlist 310 to advertisers 320 and/or listeners 160 to increase the demand for airtime from advertisers 320 and/or increase listenership. Recall that, in at least one embodiment, time-shortened playlist 310 appeals to listeners 160 since they perceive more songs played per hour and/or less time listening to disliked songs than broadcasts having only original length versions of the songs in modified library 114, or because some or all of listeners 160 dislike listening to a original length song in its entirety. As a result, listeners 160 generally will "tune in" more often to the broadcast of music provider 230 and/or more listeners 160 will listen to the broadcast. This increased listenership is often attractive to advertisers 320 since their advertisements have the potential to be heard by more listeners 160 and/or more often by listeners 160. Advertisers 320 can include businesses wanting to advertise their products or services, non-profit agencies and government agencies Wanting to educate the public using public service announcements, and the like.

As a result of the increased listenership resulting from the broadcast of songs from modified library 114 using time-shortened playlist 310, music provider 230 can generally command more consideration in return for broadcasting advertisements and announcements from advertisers 320. In addition, since some or all of the broadcast songs are a time-shortened version, music provider 230 could also broadcast more advertisements per hour without reducing the number of songs per hour found in a typical broadcast without time-shortened songs, resulting in an increased revenue from the increased number of advertisements broadcast. Additionally, music provider 230 can also provide a valuable service to advertisers 320 by guaranteeing that an advertisement will be played at one or more specific times. Recall that, in one embodiment, some or all of the songs of modified library 114 (FIG. 1) are time-shortened based on desired play length. Accordingly, music provider 230 could either broadcast a sequence of original length and/or previously time-shortened versions of songs having a total combined play length equal to the desired play length, or music provider 230 could dynamically time-shorten one or more original length songs to generate the desired play length for a sequence of songs.

For example, assume advertiser 320 requests to have its commercial broadcast at 5:20 PM (during the peak of rush-hour traffic, for example) and music provider 230 receives this request at 5:00 PM. Also assume that no permutation of the original length songs (unmodified songs 101-103, FIG. 1) on a playlist of music provider 120 will result in a combined play length of 20 minutes (the time between 5:00 PM and 5:20 PM). In this case, music provider 230 can use an embodiment of the present invention to time-shorten one or more of the original length songs to generate a combination of original length songs (unmodified songs 101-103) and time-shortened songs (modified songs 111-113) with a combined play length of 20 minutes. Music provider 230 could then broadcast this combination of songs for the 20 minute play length, ending at 5:20 PM, and then broadcast the commercial of advertiser 320 on time at 5:20 PM. For ease of illustration, the previous example ignores the time needed to identify and time-shorten the one or more original length songs.

In at least one embodiment, the time-shortened playlist 310 is also beneficial to those music providers 230 who provide music content by means other than broadcasting. For example, hold music provider 140 (FIG. 1, one embodiment of music provider 230) could distribute songs using time-shortened playlist 310, generally resulting in listener 160 having a more pleasurable experience while waiting on the telephone or waiting in an elevator. Likewise, jukebox provider 150 (FIG. 1, one embodiment of music provider 230) could provide a plurality of songs in time-shortened playlist 310. For example, if a typical jukebox plays two original length songs (unmodified songs 101-103) in exchange for 25 cents, a jukebox that plays time-shortened versions of original length songs could charge 30 cents for three time-shortened songs that have an equivalent combined play length as two original length songs. As a result, both listener 160 and jukebox provider 150 benefit. Listener 160 receives what is perceived as a better value since the two original length songs cost 12.5 cents apiece but the three time-shortened songs are only 10 cents apiece. The perception of a better value is especially applicable when listener 160 is a casual listener and therefore generally does not notice that the time-shortened songs have been time-shortened. Likewise, jukebox provider 150 benefits from an increased revenue (30 cents vs. 25 cents) for the same play length.

Figure 4:
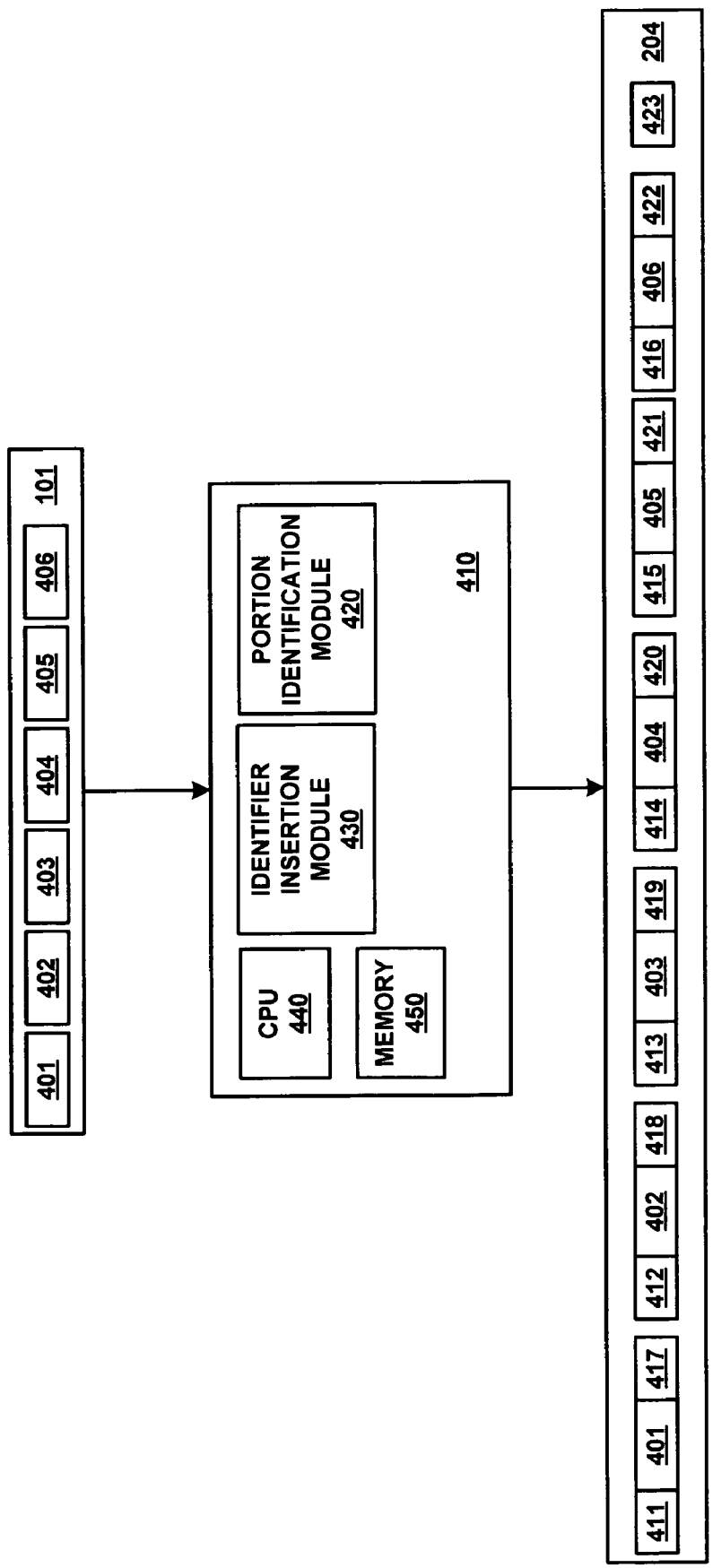
FIG. 4 is a block diagram illustrating a song analyzer used to identify a plurality of song portions of a song according to at least one embodiment of the present invention.

Referring to FIG. 4, a system for preparing an original length song for time-shortening is illustrated according to at least one embodiment of the present invention. As discussed previously, in at least one embodiment, an original length song (unmodified songs 101-103, FIG. 1) is analyzed to identify a plurality of song portions 201-203 (FIG. 2) and/or identify one or more characteristics of each of song portions 201-203. Also recall that, the one or more characteristics of song portions 201-203 can be associated with the respective song portion as identifiers 211-213. Accordingly, in at least one embodiment, song analyzer 410 is utilized to identify the plurality of song portions of original length songs and the characteristics of the plurality of song portions.

Song analyzer 410 includes portion identification module 420 and identifier insertion module 430. In one embodiment, the functions of song analyzer 410 are executed as set of instructions of a software application. Accordingly, in this case, song analyzer 410 can further include memory 450 to store the set of instructions and central processing unit (CPU) 440 to execute the set of instructions. Memory 450 can include random access memory, read-only memory, a cache, registers, and the like. CPU 440 can include a microprocessor, combinational logic, an application specific integrated circuit (ASIC), and the like. Alternately, one or more functions of song analyzer 410 are implemented in hardware, or in a combination of software and hardware.

As illustrated in FIG. 4, unmodified song 101 includes an original length version of a song having song portions 401-406 (analogous to song portions 211-213, FIG. 2). For purposes of discussion, assume that song portion 401 includes an intro, song portion 402 includes a first verse, song portion 403 includes a first chorus, song portion 404 includes a second verse, song portion 405 includes a second chorus, and song portion 406 includes an outro.

In at least one embodiment, portion identification module 420 analyzes unmodified song 101 to identify song portions 401-406. In one embodiment, the identification of song portions 401-406 is performed manually. For example, an operator of song analyzer 410 could listen to unmodified song 101 and subjectively determine the boundaries between song portions 401-406. For example, unmodified song 101 could be displayed in a graphical user interface (GUI) of song analyzer 410 as a horizontal bar. The operator could select a segment of the horizontal bar corresponding to one of song portions 401-406 and then click a button that identifies the segment as such. This could be repeated for each of song portions 401-406. Alternatively, in another embodiment, the identification of song portions 401-406 are automated. Portion identification module 420 could analyze unmodified song 101 for changes in tempo, changes in tone, the occurrence of vocals or the absence thereof, and the like. For example, portion identification module 420 could assume that any song portion of unmodified song 101 that occurs at the very beginning of unmodified song 101 includes an intro, and is identified as an intro, whereas any instrumental segment without vocals at the end of unmodified song 101 can be identified as an outro.

Once song portions 410-406 are identified by portion identification module 420, identifier insertion module 430, can analyze song portions 410-406 to determine one or more characteristics of each song portion, such as portion type, portion length, the beginning of a song portion, the end of a song portion, tempo, common notes, and the like. Additionally, one or more identifiers 411-422 representing one or more of the determined characteristics are associated with one or more of songs portions 401-406 to generate analyzed song 204. Identifiers 411-422 can be embedded within song portions in 401-406, included separately with reference to their respective song portion 401-406, and the like. For example, as illustrated in FIG. 4, identifier insertion module 430 can embed a beginning-of-portion identifier (an embodiment of identifiers 411-416) and an end-of-portion identifier (an embodiment of identifiers 417-422) for each of song portions 401-406. In this example, identifiers 411-422 can also include other information about their respective song portions 401-406, such as portion type (i.e. intro, verse, chorus, etc.), tempo, and the like. Recall that, in one embodiment, characteristic weights are associated with each of song portions 401-406, such as a weighting value based on the relative familiarity of a song portion. In this case, identifier insertion module 430 could determine the characteristic weights and/or associate them with their respective song portions 401-406 as part of identifiers 411-422.

In at least one embodiment, identifier insertion module 430 also associates song format identifier 423 with analyzed song 204, wherein song type identifier 423 represents a song format 240 (FIG. 2) of analyzed song 204 (and unmodified song 101), such as a unique sequence of song portions 401406. As with identifiers 411-422, song format identifier 423 can be embedded within analyzed song 204, placed in an information set that references analyzed song 204, and the like. In one embodiment, a component of song analyzer 410 determines song format 240. For example, portion identification module 420 could determine that the sequence of song portions 401-406 are indicative of a certain song format 240. Alternatively, an operator of song analyzer 410 could identify song format 240 of analyzed song 410 and instruct song analyzer 410 to associate the determined song format 240 with analyzed song 204 as song format identifier 423.

As discussed previously, in one embodiment, song analyzer 410 can be utilized by song editor 410 to generate analyzed song 204, which can then be time-shortened by song editor 110 (FIG. 1) and the time-shortened version provided to music provider 230 (FIG. 2). Alternatively, in another embodiment, song editor 110 can utilize song analyzer 410 to generate analyzed song 204, and then analyzed song 204, in whole or in part, can then provided to music provider 230. Music provider 230 can then time-shorten analyzed song 204 as desired. Recall that, in one embodiment, song editor 410 also provides procedure 220 to music provider 230 to aid in the time-shortening of analyzed song 204. Additionally in one embodiment the analysis of unmodified song 101 by song analyzer 410 and the subsequent time-shortening can be performed entirely by music provider 230.

Figure 5:
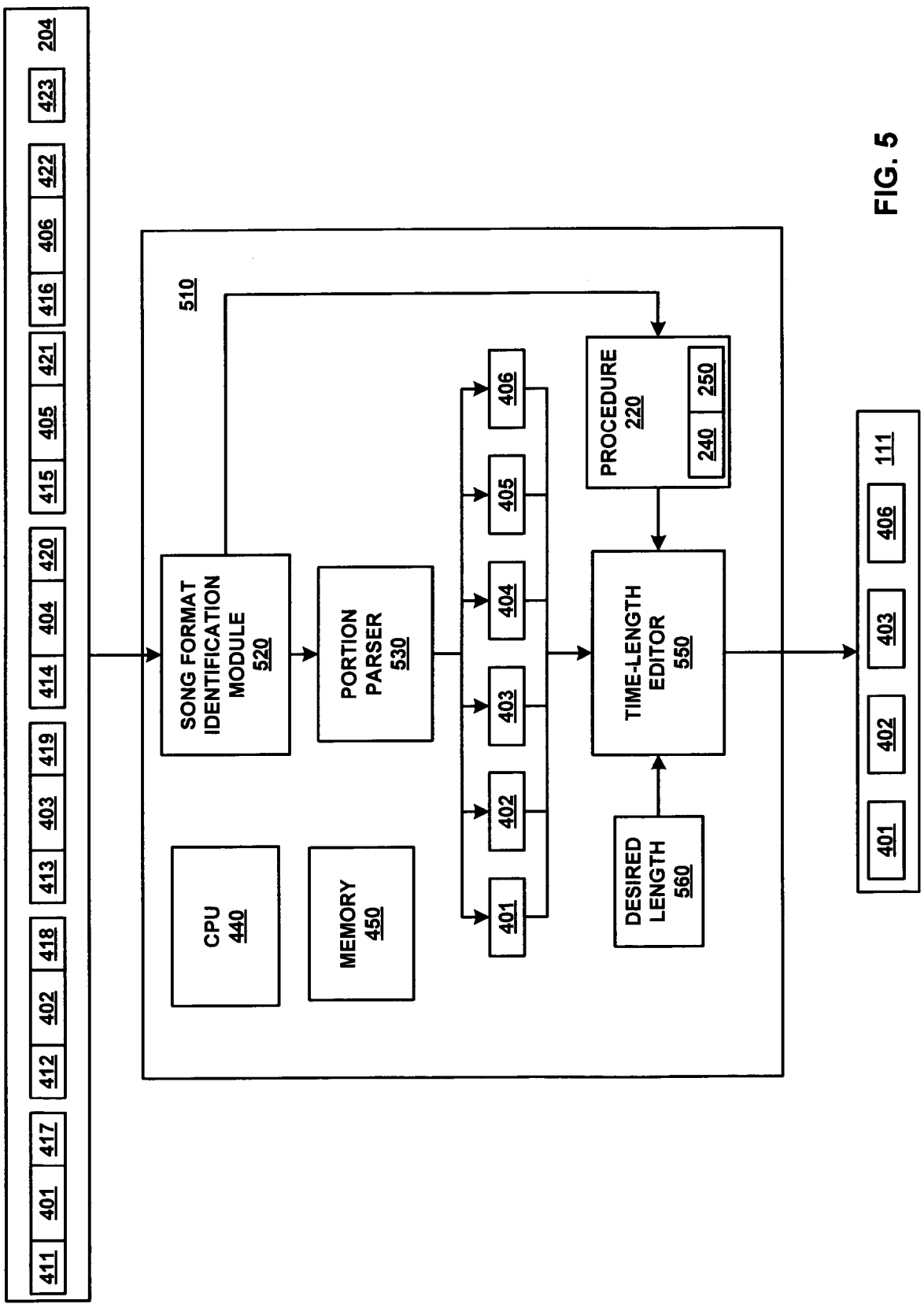
FIG. 5 is a block diagram illustrating a song shortening system used to time-shorten a song according to at least one embodiment of the present invention.

Referring next to FIG. 5, a system for time-shortening an original length song is illustrated according to at least one embodiment of the present invention. As discussed previously, in at least one embodiment, an original length song (unmodified songs 101-103, FIG. 1) is time shortened by removing one or more song portions 401-406 and/or one or more segments of one or more song portions 401-406. Accordingly, in at least one embodiment, song shortening system 510 is utilized to identify and remove one or more song portions 401-406 or segments thereof. Song shortening system 510 can be utilized by song editor 110 to generate time-shortened songs (modified songs 111-113, FIG. 1) to be provided to music provider 230 (FIG. 2), utilized by music provider 230 to generate time-shortened songs for distribution to listeners 160 (FIG. 1), and the like.

Song shortening system 510 includes song format identification module 520, portion parser 530, and time-length editor 550. In embodiments wherein one or more elements of song shortening system 510 are implemented as a set of instructions of a software application, song shortening system 510 can also include memory 450 to store the set of instructions and central processing unit (CPU) 440 to execute the set of instructions. Memory 450 and CPU 440 were discussed in greater detail previously.

In at least one embodiment, song format identification module 520 is utilized to determine song format 240 (FIG. 2) of analyzed song 204. If song format 240 has been previously identified and embedded within analyzed song 204 as song format identifier 423(such as by song analyzer 410, FIG. 1), song format identification module 520 can extract the information from song format identifier 423 to determine song format 240. Otherwise, song format identification module 520 can analyze analyzed song 204 to determine song format 240 using a variety of methods, such as comparing the sequence of song portions 401-406 with sequences in a look-up table. After determining song format 240 of analyzed song 204, in one embodiment, song format identification module 520 selects a procedure 220 and provides procedure 220 and analyzed song 204 to time-length editor 550. Analyzed song 204, in one embodiment, extracts the information from identifiers 411-423, removes identifiers 411-423, and then separates song portions 401-406 and then provides the separated song portions 401-406 to time-length editor 550.

Time-length editor 550, in one embodiment, identifies one or more song portions 401-406 to be kept (and/or identifies one or more song portions 401-406 to be excluded) to generate a time-shortened song (modified song 111). In one embodiment, procedure 220 is used by time-length editor 550 to identify those of song portions 401-406 to include in modified song 111 and/or those to exclude. As discussed previously with reference to FIG. 2, procedure 220 can include a process for modifying analyzed song 204 having song format 250 (FIG. 1) to a time-shortened version having reduced format 250 (FIG. 2). To this effect, procedure 220 can include a process to compare song format 240 with reduced format 250 and keep those of song portions 401-406 common to both song format 240 and reduced format 250 while eliminating those of song portions 401-406 that appear in only in song format 240. Recall that, in at least one embodiment, an original length song (analyzed song 204) is time-shortened in such a way that the effect of the time-shortening is not easily noticed by a casual listener (listener 160, FIG. 1). Accordingly, procedure 220 can include a procedure to time-shorten analyzed song 204 in a manner that does not gather the attention of a casual listener. Various embodiments of procedure 220, song format 240 and reduced format 250 are discussed in greater detail subsequently with reference to FIGS. 6-9.

As discussed previously, a certain combined playback length of a group of songs may be needed (such as to broadcast a commercial at a specific time). In this case, it may be determined that a certain song of the group of songs may need to be a certain length (desired length 560). Accordingly, in at least one embodiment, time-length editor 550 time-shortens analyzed song 204 based on desired length 560. A playback length of modified song 111 equivalent to desired length 560 can be achieved by time-length editor 550 by removing one or more song portions 401-406. However, it will be appreciated that no acceptable permutation of song portions 401-406 may exist that has a playback length equivalent to desired length 560. For example, if each of song portions 401-406 have a length of 20 seconds and desired length 560 is 70 seconds, no combination of song portions 401-406 having a playback length of 60 seconds exists. Accordingly, in at least one embodiment, time-length editor 550 generates modified song 111 by removing one or more segments from one or more song portions 401-406 instead of, or in addition to, removing one or more of song portions 401-406. Using the previous example, time-length editor 550 combine song portion 401- 403 and the first ten second segment of song portion 406 to generate modified song 111 having a playback length equivalent to desired length 560 of 70 seconds (20+20+20+10 seconds).

It should be recognized that dividing the song portions 401-406 of analyzed song 204 into a pluralities of segments is, for the most part, equivalent to dividing analyzed song 204 into a greater number of song portions. For example, each of the six song portions 401-406 of analyzed song 204 could be subdivided into two song portions to generate twelve song portions for analyzed song 204. Accordingly, any reference made herein to song portions, such as analyzing, identifying, combining, or removing song portions, also applies to segments of song portions unless otherwise noted.

As a result of a time-shortening procedure (such as procedure 220) performed on analyzed song 204 by time-length editor 550, modified song 111 having a shortened playback time compared to the original length version (unmodified song 101) is generated. Modified song 111, as discussed previously, can then be combined with other songs, original length and/or time-shortened versions, to generate modified library 114 (FIG. 1), provided to music provider 230 (FIG. 2) for distribution to listeners 160 (FIG. 1), and the like.

Referring to FIGS. 6-9, a table of song formats for a variety of song types and a corresponding table of reduced formats for the songs are illustrated according to at least one embodiment of the present invention. Table 600, as illustrated in FIGS. 6 and 7, includes a plurality of song formats 601-660 (various embodiments of song format 250, FIG. 2) in song format column 690 and their one or more corresponding reduced formats 801-846 (various embodiments of reduced format 250, FIG. 2) are detailed in corresponding reduced format column 695 of table 800 of FIGS. 8 and 9. As discussed previously, in at least one embodiment, procedure 220 (FIG. 2) is utilized to time-shorten an original length song (unmodified songs 101-103, FIG. 1) to generate a time-shortened version (modified songs 111-113, FIG. 1). In at least one embodiment, procedure 220 is based on determining one of song formats 601-660 of a song and then removing and/or modifying one or more song portions 401-406 (FIG. 4) of the song resulting in a time-shortened song having one of reduced formats 801-846.

Procedure 220 (FIG. 2), in one embodiment, can be interpreted as a conditional statement, i.e. "if" song format 250 of a song=one of song formats 601-660, "then" remove/modify song portions to generate a time-shortened song having a corresponding reduced format of reduced formats 801-846. For example, a conditional statement could be applied to a 12-bar blues song having song format 601 thusly: "if" song format=song format 601, "then" time-shortened format=reduced format 801, 802, 803, or 804. As demonstrated in the previous example, for many of song formats 601-660, there exist multiple possible reduced formats 801- 846. In this case, the reduced format chosen can depend on a number of factors, such as desired time-shortened length, a weighting applied to one or more of the plurality of song portions 401-406 of the original length song, and so on. Recall that procedure 220 is implemented, in one embodiment, as a set of executable instructions of a software application or as a data set utilized by a software application. In other embodiments, procedure 220 is implemented as instructions that can be performed manually. For example, procedure 220 could be implemented as a set of human readable instructions, such as a document or as a text file, that direct the removal and/or modification of one or more song portions 401-406 of an original length song to generate a time-shortened song.

In order to clarify the symbol convention used in tables 600 and 800, key table 950 (FIG. 9) having those symbols used and their corresponding meaning will be discussed briefly. The symbol "V" represents a verse of a song, the symbol "C" represents a chorus, the symbol "I" represents the intro of a song, and an "O" represents a an outro. Note that although each of song formats 601-660 are illustrated as including an intro and an outro, one or both of these song portions may not be present in the actual song being time-shortened. The appropriate song format still applies, however, in this case. The symbol "O~" represents an outro repeated one or more times. In at least one embodiment, the outro is repeated no more than three times. The symbol "Br" represents a bridge or unrelated interlude. The symbol "$V_{solo}$" represents an instrumental bridge built from one or more verses (V) and/or one or more choruses (C). The symbol "$V_{\{c-v\}}$" represents a verse (V) derived from a chorus (C) that works as a verse (V) with changing lines. The symbol "$V_{\{v-c\}}$" represents a verse derived from a verse that has a line that works as a chorus (C) or as a song title. The symbol "$C_{\{c-v\}}$" represents a chorus (C) derived from a chorus (C) that works as a verse (V) with changing lines. The symbol "$C_{\{v-c\}}$" represents a chorus derived from a verse that has a line that works as a chorus (C) or a song title.

The following symbol constructs make use of "Z", wherein "Z" can represent any song portion type, such as a verse (V), a chorus (C), a bridge (Br), an intro (I), an outro (O), or a sequence of song portions, such as "V/C". The symbol "$[Z]^Y$" represents Z repeated Y times. For example, "$[V/C/V_{solo}]^2$", where Z="V/C/$V_{solo}$", is equivalent to "Z/Z", i.e. "V/C/$V_{solo}$/ V/C/$V_{solo}$". Note that the "/" symbol is stylistic and is intended to visually separate the different symbols of the format (song formats 601-660 or reduced formats 801-846). The symbol "XZ" represents a song portion having an extended number of measures. For example, "2V" could be a 12-bar blues verse having 24 measures rather than "V" having 12 measures. A subscript number assigned to the symbol "X", such as "$X_1$", is used to indicate multiple song portions of the same type having a different number of measures. For example "$X_1 V$" represents a verse having a first number of measures and "$X_2 V$" represents a verse having a second number of measures different the first. The symbol "Y" is equivalent to the symbol "X", but is used to when more than one song portion type is present in a format. For example, the format "XV/YC" represents a verse extended by a first certain number of measures followed by a chorus extended by a second number of measures, where the second number of measures can be equivalent or different from the first number of measures. Using the symbols discussed in reference to key 950, various examples of the time-shortening of songs having one of song formats 601-660 to time-shortened songs having one of song formats 801-846 are discussed.

A relatively simple time-shortening procedure 220 (FIG. 2) can be illustrated using song format 613. Song format 613 ("I/XV/$V_{solo}$/V/C/V/O"), as described using key 950, includes an intro (I) followed by a verse extended a certain number of measures (XV) followed by an instrumental solo ($V_{solo}$) followed by a verse (V) followed by a chorus (C) followed by another verse (V) followed by an outro (O). Using table 600, possible reduced formats that can be used to time-shorten songs having song format 613 include reduced formats 806, 807, 809, and 810. Any one of reduced formats 806, 807, 809, and 810 could be used to time-shorten the song. In this example, reduced format 806 will be used for ease of illustration. Reduced format 806 includes a format of "I/V/C/O~". Using reduced format 806, one or more song portions 401-406 (FIG. 4) of the song having song format 613 are removed/modified to generate a time-shortened song having reduced song format 806. In this example, the song portions represented by "XV" and "$V_{solo}$" are removed since they are not present in reduced format 806.

Note that song format 613 includes two verses ("V") while reduced format 806 includes only one verse (V). Accordingly, one of the verses must be selected for removal using a variety of methods. For example, a verse (V) could be chosen at random or the first verse to occur in a song could be always be kept in a song having reduced format 806. Recall that, in one embodiment, song portions 401-406 of analyzed song 204 (FIG. 2) are weighted according to a characteristic of the song portion, such as its length or its familiarity. For example, the song having song format 613 could have one verse that is very well known to listeners 160 (FIG. 1) and another verse that is not as well known. Accordingly, the more familiar verse could be weighted more heavily and the less familiar verse could be weighted less heavily. In this case, the verse weighted most heavily could be kept while the least heavily weighted verse could be removed. For this example, assume the first verse (V) of song format 613 is kept while the second verse (V) is removed.

At this point, the "I/V" portion sequence of reduced format 806 ("I/V/C/O~") has been determined. Since there is only one chorus (C) in the song having song format 613 and a single chorus (C) occurs in reduced format 806, the chorus (C) is kept. Now only the outro needs to be considered. Reduced format 806 dictates that a repeated outro (O~) be used. Accordingly, the outro is repeated a desired number of times, generally not more than three times in the time-shortened version (modified songs 111-113, FIG. 1). The number of repetitions can depend on a desired length of the time-shortened version, on the stylistic preferences of an operator who is performing procedure 220 (FIG. 2) to generate the time shortened version, and so on. Using reduced format 806 as a guide, one or more song portions 401-406 (FIG. 4) can be removed from a song having song format 613 to generate a time-shortened version having reduced format 806. This process of time-shortening based on converting from one of song formats 601-660 to one of reduced formats 801-846, (i.e. procedure 220, FIG. 2) can be implemented as instructions for manual time-shortening or as executable sets of instructions or data used by a software application.

A more complicated example may be illustrated using a song having song format 621, such as "Folsom Prison Blues" by Johnny Cash. As illustrated in table 600, song format 621 ("I/[XV$_{\{v-c\}}$/XV$_{\{c-v\}}$]$^Y$/V/O") represents a song having an intro (I) followed by a sequence of an extended verse (XV$_{\{c-v\}}$) derived from a verse that has a line that works as a chorus or song title and then an extended verse (V$_{\{c-v\}}$) derived from a chorus that works as a verse with changing lines, where the sequence is repeated Y times. This is followed by a verse (V) and then an outro (O). The corresponding potential reduced format for songs having song format 621 includes reduced format 817 ("I/[XV$_{\{v-c\}}$]$^Y$/V/O"). In this example, the extended verse (V$_{\{c-v\}}$) derived from a chorus that works as a verse with changing lines is removed completely when the song having song format 621 is time-shortened to a song having reduced format 817, resulting the time-shortened ver- sion having the verse (V) followed by the extended verse (XV$_{\{v-c\}}$) repeated Y times, then the verse (V), followed by the outro (O).

As a third example, the time-shortening of a song having song format 660, such as "These Are Days" by the 10,000 Maniacs, is illustrated. Song format 660, as illustrated in table 660 of FIG. 7, has the format of "I/[C/(X$_1$,X$_2$)V]$^Y$/C/X$_1$V/O". Note that the symbol "(X$_1$,X$_2$)V" is not listed in key 950. The symbol "(X$_1$,X$_2$)V" represents a verse that has a first number of measures, represented by X$_1$, for the first occurrence of the verse, while the verse has a second number of measures, represented by X$_2$, when the verse is repeated. For example, "[C/(X$_1$,X$_2$)V]$^2$" is equivalent to "C/X$_1$V/C/X$_2$V". As demonstrated in table 600, song format 660 has a corresponding potential reduced format 846 ("I/[C/(X$_1$,X$_2$)V]$^Y$/O"). In this case, procedure 220 (FIG. 2) could include instructions to remove the chorus (C) and the extended verse (X$_1$V) from the "C/X$_1$V/O" portion of song format 660, resulting in a time-shortened version having a format of ("I/[C/(X$_1$,X$_2$)V]$^Y$/O") equivalent to reduced format 846.

Figure 10:
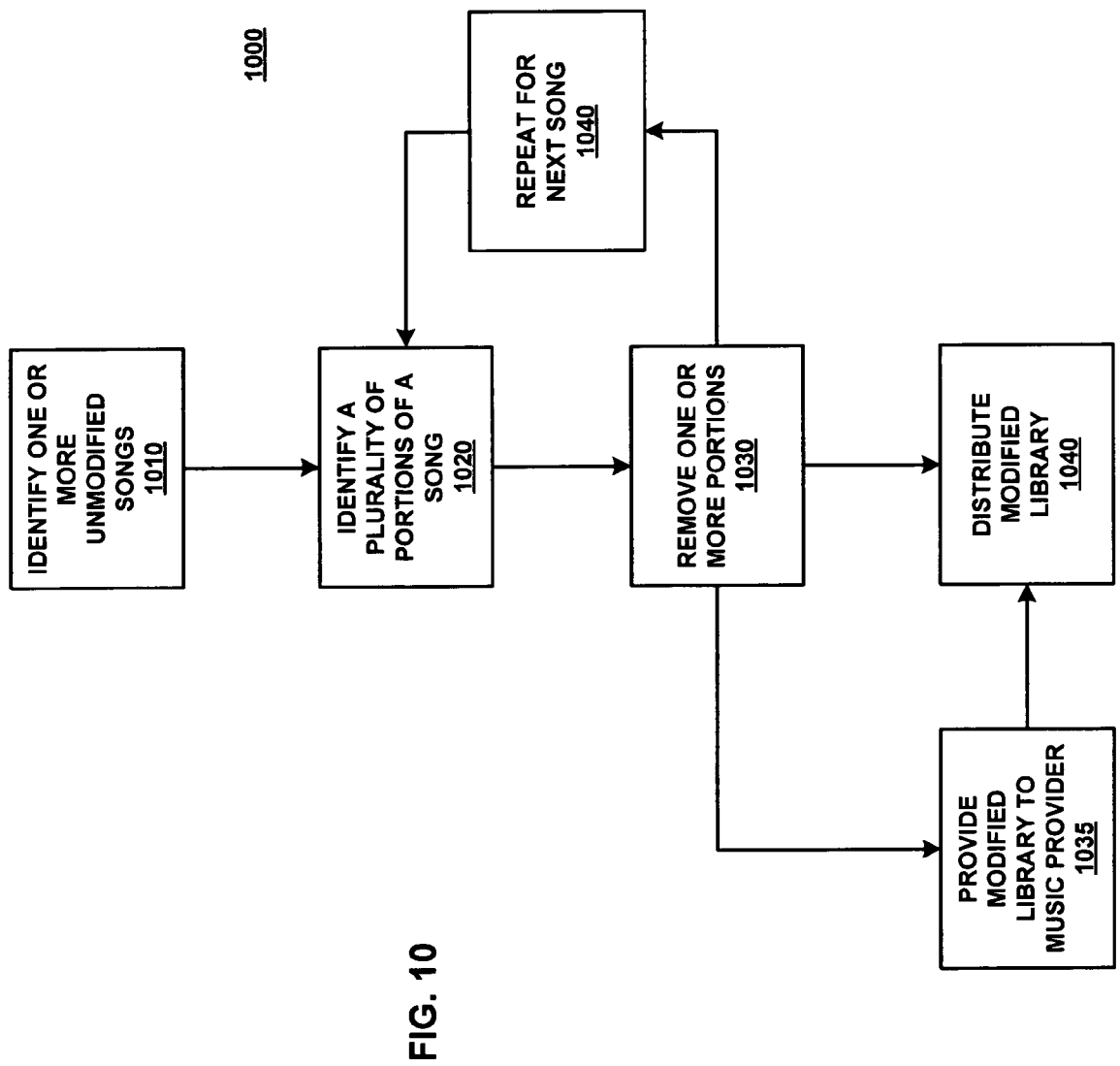
FIG. 10 is a flow diagram illustrating a method for time-shortening one or more songs according to at least one embodiment of the present invention.

Referring to FIG. 10, a method for generating a library of songs having at least one time-shortened song is illustrated according to at least one embodiment of the present invention. Library generation method 1000 initiates with step 1010 wherein one or more unmodified songs 101-103 (FIG. 1) are identified for inclusion in original library 104 (FIG. 1). An unmodified song can include a commercially available version of a song such as a radio version, an extended play version, a mix version, and the like. One or more of unmodified songs 101-103, in one embodiment, can also include versions of songs that have previously been time-shortened. For example, a record label could provide two versions of an artist's song on an album, such as an extended play version and a radio version meant for broadcast. In this case, the extended play version could be selected for time-shortening that results in a different version than the radio version, or the radio version could be selected for additional time-shortening. Unmodified songs 101-103 can be selected from a plurality of songs based on a variety of factors. Unmodified songs 101-103 could be selected based on song type, tempo, artist, place on a ranking list, date of debut, and so on. For example, a plurality of unmodified songs 101-103 could be selected from a country-western playlist based on the artist who performs the song.

In step 1020, a plurality of song portions 401-406 (FIG. 4) are identified for one of the plurality of unmodified songs 101-103. Song portions 401-406 can be identified manually or by using a song editing system, such as song analyzer 410 (FIG. 4). For example, an operator could listen to unmodified song 101 and subjectively parse unmodified song 101 into a plurality of song portions 401-406. Alternatively, song analyzer 410 could analyze the data representative of unmodified song 101 to determine the transitions between the plurality of song portions 401-406, such as a change in tempo, the inclusion of vocals, and so on. The plurality of portions 401-406 can include an intro, verses, choruses, bridges, solos, outros, and the like. The plurality of portions 401-406 can also include sub-portions of an intro, a verse, a chorus, a bridge, a solo, an outro, and the like.

Additionally, in at least one embodiment, one or more characteristics of the plurality of song portions 401-406 (FIG. 4) are identified and associated with each of the plurality of song portions 401-406 as identifiers 411-422 (FIG. 4). Identifiers 411-422 can be embedded in the data representative of song portions 401-406, or as separate data that references song portions 401-406, resulting in analyzed song 204 (FIG. 2). Identifiers 411-422 can include, but are not limited to, portion length, portion type, tempo, chord, a value indicating the presence of vocals, characteristic weighting values, and the like. In at least one embodiment, song format 240 (FIG. 2) of the selected song is determined and included as song format identifier 423 in analyzed song 204. The determining and association of identifiers 411-422 can be performed manually or by using an automated system such as song analyzer 410 (FIG. 4).

In at least one embodiment, one or more of the plurality of song portions 401-406 (FIG. 4) identified in step 1020 are removed to generate a modified song (modified songs 111-113, FIG. 1), wherein the modified song is a time-shortened version of the unmodified song analyzed in step 1020. As discussed previously, in at least one embodiment, the one or more song portions 401-406 selected for removal are selected according to procedure 220 (FIG. 2). Procedure 220, in one embodiment, includes a set of instructions or a process that directs the modification of the original length having song format 240 to a reduced format 250. In one embodiment, procedure 220 is utilized to time-shorten the selected song of unmodified songs 101-103 (FIG. 1) in such a way that a casual listener (listener 160, FIG. 1) would not easily recognize that the selected song has been time-shortened, while in another embodiment, procedure 220 is utilized to time-shorten the selected song so that the selected song is of a predetermined playback length (desired length 560, FIG. 5). Alternatively, procedure 220 could be selected based on a variety of other factors, such as the effort or processing time required to apply a certain formula 550 to a selected song. In step 1040, steps 1020 and 1030 are performed another song of the plurality of unmodified songs 101-103, and so on, until all of the songs of the plurality of unmodified songs 101-103 (FIG. 1) that are selected for time-shortening have been time-shortened.

The result of steps 1010-1040, modified library 114 (FIG. 1), can then be distributed to listeners 160 (FIG. 1). If steps 1010-1040 are performed by an intermediary (song editor 110, FIG. 1) intending to provide modified library 114 to music provider 230 (FIG. 2) for distribution to listeners 160, in one embodiment, library generation method 1000 includes step 1035, wherein modified library 114 is provided to music provider 230 for distribution. For example, song writer 110 could time-shorten one or more songs of original library 104 (FIG. 1) to generate modified library 114 as illustrated in steps 1010-1040. Song writer 110 could then record modified library 114 on a storage device using an appropriate format. For example, song writer 110 could record the songs of modified library 114 as MP3 files or wav files on a compact disc (CD), and then provide this CD to music provider 230 for distribution to listeners 160 or addition to a library available to music provider 230. Alternatively, song writer 110 could electronically transmit the songs of modified library 114. For example, song writer 110 could e-mail the songs of modified library 114 as a file attachment to an email.

In step 1040, music provider 230 (FIG. 2), in one embodiment, distributes one or more time-shortened songs (modified songs 111-113, FIG. 1) from modified library 114 (FIG. 1) to one or more listeners 160 (FIG. 1). For example, in embodiments wherein music provider 230 includes radio broadcaster 120 (FIG. 1), distribution of songs from modified library 114 can include a radio broadcast of a sequence of time-shortened songs from modified library 114. Likewise, in embodiments wherein music provider 230 includes Internet broadcaster 130 (FIG. 1), distribution of time-shortened songs can include transmitting one or more songs selected by an Internet user (listeners 160) or in an Internet broadcast to a plurality of listeners 160 in a manner similar to a radio broadcast. In embodiments wherein music provider 230 includes hold music provider 140 (FIG. 1), time-shortened songs could be played over a telephone system to a telephone user (listener 160) who is placed on hold. In embodiments where music provider 230 includes jukebox provider 150 (FIG. 1), distribution of time-shortened songs can include playing one or more songs using a music output device, such as a jukebox, available to listener 160. For example, listener 160 could select one or more time-shortened songs to be played by a jukebox (jukebox provider 150) in exchange for money.

The steps of library generation method 1000 can be performed manually, performed using an automated process, or a combination thereof. For example, the step of selecting one or more unmodified songs 101-103 (FIG. 1) to be time shortened (step 1010) and the step of identifying a plurality of song portions 401-406 (FIG. 4) of each song to be time-shortened could be performed by a person, while the step of removing one or more song portions 401-406 to generate a time-shortened song (modified songs 111-113, FIG. 1) (step 1030) and the step of providing modified library 114 (FIG. 1) to music provider 230 (FIG. 2) (step 1040) could be performed by a information processing system, such as a networked computer.

Figure 11:
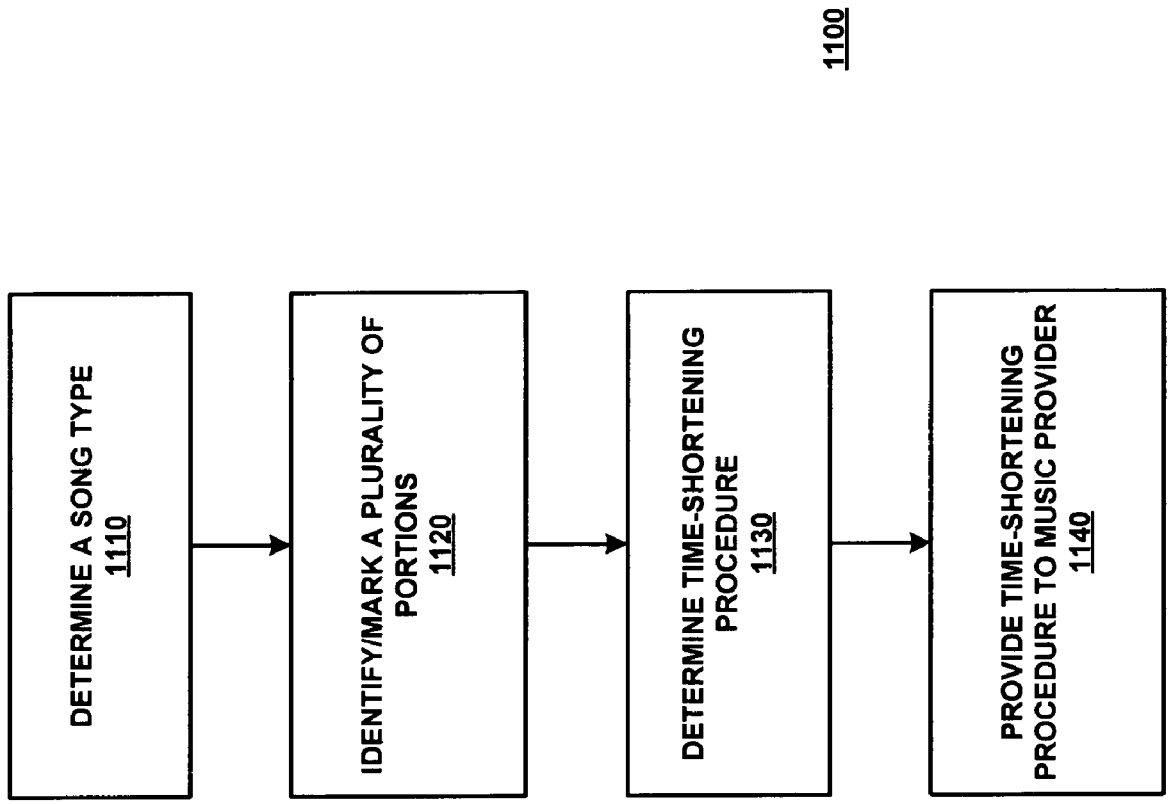
FIG. 11 is a flow diagram illustrating a method for enabling a music provider the ability to generate time-shortened songs according to at least one embodiment of the present invention.

Referring now to FIG. 11, a method for enabling a music provider to time-shorten one or more songs is illustrated according to at least one embodiment of the present invention. Edit method 1100 initiates with step 1110 wherein a plurality of song portions 401-406 (FIG. 4) of an original length song (unmodified songs 101-103, FIG. 1) selected for time-shortening are identified. Song portions 401-406, in one embodiment, include the various components of a song, such as an intro, a chorus, a verse, a bridge, and outro, and the like. The plurality of song portions 401-406 can be identified manually, such as by a person determining different song portions 401-406 by ear, or by using an automated process, such as a software application (song analyzer 410, FIG. 4, for example) run on a computer that analyzes the original length song to determine the plurality of song portions 401-406. In at least one embodiment, the plurality of song portions 401-406, once identified, are marked as such using identifiers 411-422 (FIG. 4). Identifiers 411-422 can be embedded within the data representative of the plurality of song portions 410-406 or recorded separately, such as in a table that references song portions 401-406. Recall that, in one embodiment, characteristic weights are assigned to one or more of song portions 401-406. In this case, identifiers 411-422 can include values representative of the characteristic weights.

In one embodiment, song format 240 (FIG. 2) of the selected original length song is determined. As discussed previously, song format 240 can include a unique sequence or "equation" of song portion types. For example, the selected original length song could include an intro (I), a verse (V), a chorus (C), another verse, and an outro (O). Song format 240 for the selected original length song could then be represented by the "I/V/C/V/O". In at least one embodiment, song format 240 is embedded in the data representative of the selected original length song (analyzed song 204, FIG. 2) as song format identifier 423 (FIG. 4) or recorded separately, such as in a table.

In step 1130, procedure 220 (FIG. 2) used to time-shorten the selected original length song is selected or generated. As discussed previously, in at least one embodiment, procedure 220 is selected/generated based on song format 240 (FIG. 2) of the selected original length song. Using the previous example, the sequence "I/V/C/O" of song format 240 could have a sequence of "I/V/C/O" for the corresponding reduced format 250 (FIG. 2). Accordingly, in this example, procedure 220 could include instructions that direct the reduction of the selected original length song from song format 250 ("I/V/C/V/O") to reduced format 240 ("I/V/C/O"). Procedure 220, in one embodiment, includes a set of software instructions or a data set that is to be used by an automated process to time-shorten the selected original length song. Alternatively, in one embodiment, procedure 220 includes instructions for manually time-shortening the selected original length song. For example, procedure 220 could include, a written guide with step-by-step instructions, such as "1) record from 0:00 to 0:20 2) record from 0:35 to 1:00 3) record from 1:30 to 2:10", for example.

In step 1140, music provider 230 (FIG. 2) is provided with the necessary information to enable music provider 230 to time-shorten the selected original length song. Enable method 1100, in one embodiment, is utilized by one entity, such as song editor 110 (FIG. 1), to provide the ability to time-shorten an original length song to another entity, such as music provider 230 (FIG. 2). In one embodiment, music provider 230 is provided with analyzed song 204 (FIG. 2) with identifiers 411-422 (FIG. 4) embedded. In this case, music provider 230 could use an available method to time-shorten analyzed song 204 based on the identifiers. For example, music provider 230 could have one or more procedures 220 (FIG. 2) available for time-shortening a song having a particular song format 240 (FIG. 2). In this case, music provider 230 could use its own procedure 220 to remove one or more of the plurality of song portions 401-406 (FIG. 4) identified using identifiers 411-422 (FIG. 4). In another embodiment, music provider 230 is provided with identifiers 411-422 without analyzed song 204. In this case, music provider 230 could use identifiers 411-422 to identify a plurality of song portions 401-406 of a copy of the selected original length version. Once identified using identifiers 411-422, music provider 230 could use one or more available procedures 220 to time-shorten the copy. For example, identifiers 411-426 could include a table of start-of-portion and end-of-portion identifiers for each of the plurality of song portions 401-406. Music provider 230 can then use the table to identify the plurality of song portions 401-406 of the copy and remove one or more of them according to procedure 220.

Alternatively, in one embodiment, both analyzed song 204 (FIG. 2) and procedure 220 (FIG. 2) are provided to music provider 230 (FIG. 2). In this case, music provider 230 could use the supplied procedure 220 to time-shorten the supplied analyzed song 204 (FIG. 2). For example, procedure 220 could include a data set used by a software application used to time-shorten songs and analyzed song 204 could be stored in digital format. In this case, the software application could apply procedure 220 to analyzed song 204 to generate a time-shortened song (modified songs 111-113, FIG. 1). In another embodiment, music provider 230 is supplied with procedure 220 which can the applied to a copy of the selected original song available to song provider 230. For example, music provider 230 car make use of song analyzer 410 (FIG. 4) to generate analyzed song 204 and then apply the supplied procedure 220 to analyzed song 204 to generate a time-shortened version.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

One of the implementations of the invention is as sets of computer readable instructions resident in the random access memory of one or more processing systems configured generally as described in FIGS. 1-11. Until required by the processing system, the set of instructions may be stored in another computer readable memory, for example, in a hard disk drive or in a removable memory such as an optical disk for eventual use in a compact disc (CD) drive or digital versatile disc (DVD) drive or a floppy disk for eventual use in a floppy disk drive. Further, the set of instructions can be stored in the memory of another processing system and transmitted over a local area network or a wide area network, such as the Internet, where the transmitted signal could be a signal propagated through a medium such as an ISDN line, or the signal may be propagated through an air medium and received by a local satellite to be transferred the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information. The preceding detailed description is, therefore, not to be taken in a limiting sense, and the scope of the present invention is defined only by the appended claims.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   receiving first data representative of a first song;
   analyzing the first song to determine a plurality of song portions of the first song, each of the plurality of song portions comprising one selected from a group consisting of: an intro; an outro; a verse; a chorus; a bridge; or an interlude;
   generating second data comprising a plurality of identifiers associated with the plurality of song portions, each identifier representing at least one characteristic of a corresponding song portion, the at least one characteristic comprising a familiarity weight representative of an expected familiarity of the corresponding song portion to a listener; and
   storing the first data and the second data at a storage device.

2. The method of claim 1, wherein the characteristic of a corresponding song portion comprises one selected from a group consisting of: a characteristic weight associated with the song portion; a tempo of the song portion; a song portion type; or a length of the portion.

3. The method of claim 1, wherein storing the first data and the second data at a storage device comprises embedding the second data within the first data at the storage device.

4. The method of claim 1, wherein the storage device comprises a portable storage device selected from a group consisting of: a compact disc (CD); a digital versatile disc (DVD); or a magnetic tape.

5. The method of claim 1, further comprising:
   providing the storage device to a music provider;
   generating, at the music provider, third data representative of a second song based on the first data and the second data, the second song comprising a first time-shortened version of the first song having fewer than the plurality of song portions; and
   providing the second song to at least one listener based on the third data.

6. The method of claim 5, further comprising:
   generating, at the music provider, fourth data representative of a third song based on the first data and the second data, the third song comprising a second time-shortened version of the first song having fewer than the plurality of song portions, the second time-shortened version different than the first time-shortened version of the first song.

7. The method of claim 5, wherein generating the third data representative of the second song comprises:
   determining a song portion of the plurality of song portions to be removed;
   determining data of the first data associated with the song portion to be removed based on the plurality of identifiers; and
   removing the identified data from the first data to generate the third data.

8. An apparatus comprising:
   a storage device embodying a set of data, the set of data comprising:
     first data representative of a first song, the first song comprising a plurality of song portions, each of the plurality of song portions comprising one selected from a group consisting of: an intro; an outro; a verse; a chorus; a bridge; or an interlude; and
     second data comprising a plurality of identifiers associated with the plurality of song portions, each identifier representing at least one characteristic of a corresponding song portion, the at least one characteristic comprising a familiarity weight representative of an expected familiarity of the corresponding song portion to a listener.

9. The apparatus of claim 8, wherein the characteristic of a corresponding song portion comprises one selected from a group consisting of: a characteristic weight associated with the song portion; a tempo of the song portion; a song portion type; or a length of the portion.

10. The apparatus of claim 8, wherein the second data is embedded within the first data at the storage device.

11. The apparatus of claim 8, wherein the storage device comprises a portable storage device selected from a group consisting of: a compact disc (CD); a digital versatile disc (DVD); or a magnetic tape.

12. The apparatus of claim 8, further comprising:
    an information handling machine coupled to the storage device, the information handling machine configured to:
      access the first data and the second data from the storage device;
      generate third data representative of a second song based on the first data and the second data, the second song comprising a time-shortened version of the first song having fewer than the plurality of song portions; and
      provide the second song to at least one listener based on the third data.

13. A method comprising:
    receiving, at a music provider, first data representative of a first song, the first song comprising a plurality of song portions, each of the plurality of song portions comprising one selected from a group consisting of: an intro; an outro; a verse; a chorus; a bridge; or an interlude;
    receiving, at the music provider, second data comprising a plurality of identifiers associated with the plurality of song portions, each identifier representing at least one characteristic of a corresponding song portion, the at least one characteristic comprising a familiarity weight representative of an expected familiarity of the corresponding song portion to a listener;
    generating, at the music provider, third data representative of a second song based on the first data and the second data, the second song comprising a first time-shortened version of the first song having fewer than the plurality of song portions; and
    providing the second song to at least one listener based on the third data.

14. The method of claim 13, further comprising:
    generating, at the music provider, fourth data representative of a third song based on the first data and the second data, the third song comprising a second time-shortened version of the first song having fewer than the plurality of song portions, the second time-shortened version different than the first time-shortened version of the first song.

15. The method of claim 13, wherein the characteristic of a corresponding song portion comprises one selected from a group consisting of: a characteristic weight associated with the song portion; a tempo of the song portion; a song portion type; or a length of the portion.

16. The method of claim 13, wherein receiving the second data comprises receiving a portable storage device embodying the second data, the portable storage device selected from a group consisting of: a compact disc (CD); a digital versatile disc (DVD); or a magnetic tape.

17. The method of claim 16, wherein the portable storage device further embodies the first data.

18. The method of claim 13, wherein receiving the second data comprises receiving an electronic transmission representative of the second data at an information handling machine of the music provider.

19. The method of claim 13, wherein generating the third data representative of the second song comprises:
- determining a song portion of the plurality of song portions to be removed;
- determining data of the first data associated with the song portion to be removed based on the plurality of identifiers; and
- removing the identified data from the first data to generate the third data.

20. The method of claim 19, wherein determining a song portion of the plurality of song portions to be removed comprises:
- receiving, at the music provider, a procedure to shorten the first song, the procedure identifying at least one song portion of the plurality of song portions of the first song to be removed; and
- determining the song portion to be removed based on the procedure.

21. The method of claim 20, further comprising:
- determining the procedure from a plurality of procedures based on a song format represented by the plurality of song portions.

* * * * *